United States Patent [19]

Carteau et al.

[11] Patent Number: 4,755,892
[45] Date of Patent: Jul. 5, 1988

[54] METHOD OF AND APPARATUS FOR DISPLACING A MOVABLE SYSTEM DRIVEN BY AN ELECTRIC MOTOR ALONG A GIVEN TRAJECTORY

[75] Inventors: Daniel Carteau, Limours; Jean-Jacques Couette, Montigny le Bretoneux; Christian Maury, Velizy; Pham D. Tam, Bagneux, all of France

[73] Assignee: Cii Honeywell Bull, Paris, France

[21] Appl. No.: 803,509

[22] Filed: Nov. 29, 1985

[30] Foreign Application Priority Data

Nov. 29, 1984 [FR] France ................. 84 18157

[51] Int. Cl.[4] ............... G11B 21/02; G11B 5/54; G05B 19/00
[52] U.S. Cl. ................... 360/75; 360/105; 318/331; 318/561
[58] Field of Search ............ 360/75, 78, 105, 109, 360/106; 318/561, 567, 575, 578, 590, 331; 364/167, 169

[56] References Cited

U.S. PATENT DOCUMENTS

| 4,202,020 | 5/1980 | Lougren et al. ............ 360/75 |
| 4,571,648 | 2/1986 | Barski ................ 360/105 |
| 4,660,106 | 4/1987 | Harrison et al. ............ 360/75 |
| 4,675,586 | 6/1987 | Eigner et al. ............ 318/331 |

FOREIGN PATENT DOCUMENTS

| 0069546 | 1/1983 | European Pat. Off. . |
| 1491735 | 9/1966 | France . |
| 2172733 | 9/1973 | France . |
| 58-177571 | 10/1983 | Japan ................ 360/78 |

OTHER PUBLICATIONS

IBM Technical Disclosure Bulletin, vol. 25, No. 3A, 8/83, pp. 1244-1246.
IBM Technical Disclosure Bulletin, vol. 26, No. 1, 6/83, pp. 376-377.
IBM Technical Disclosure Bulletin, vol. 22, No. 6, 11/79, pp. 2501-2504.

Primary Examiner—Raymond F. Cardillo
Assistant Examiner—Steven R. Garland
Attorney, Agent, or Firm—Lowe, Price, LeBlanc, Becker & Shur

[57] ABSTRACT

A magnetic disk memory is moved between a first position beyond the disk periphery to a second position proximate the disk periphery while the head is at an idle height above the disk face. The head is moved between the disk periphery and a third position at the edge of an area on the disk where data are located while the head is lowered and raised between the idle height and a hovering height above a face of the disk. An assembly carrying the head includes a radially extending arm, turned by a rotary DC motor. A continuous step excitation waveform is supplied to the motor as the head is driven between the first and second positions until the head arrives at one of the two positions. Each of the steps has a constant amplitude that differs from the immediately preceding step by a predetermined incremental value. All of the steps, except the last step, has the same predetermined duration. The last step has a time duration no greater than that of the previous steps and determined by when the head arrives at the one position. To drive the head between the second and third positions a damping impulse having a predetermined constant amplitude and duration is applied to the motor to cause the motor to stop. The motor is stopped without overshoot and driven to a predetermined speed by then applying a decreasing ramp excitation waveform to it.

21 Claims, 7 Drawing Sheets

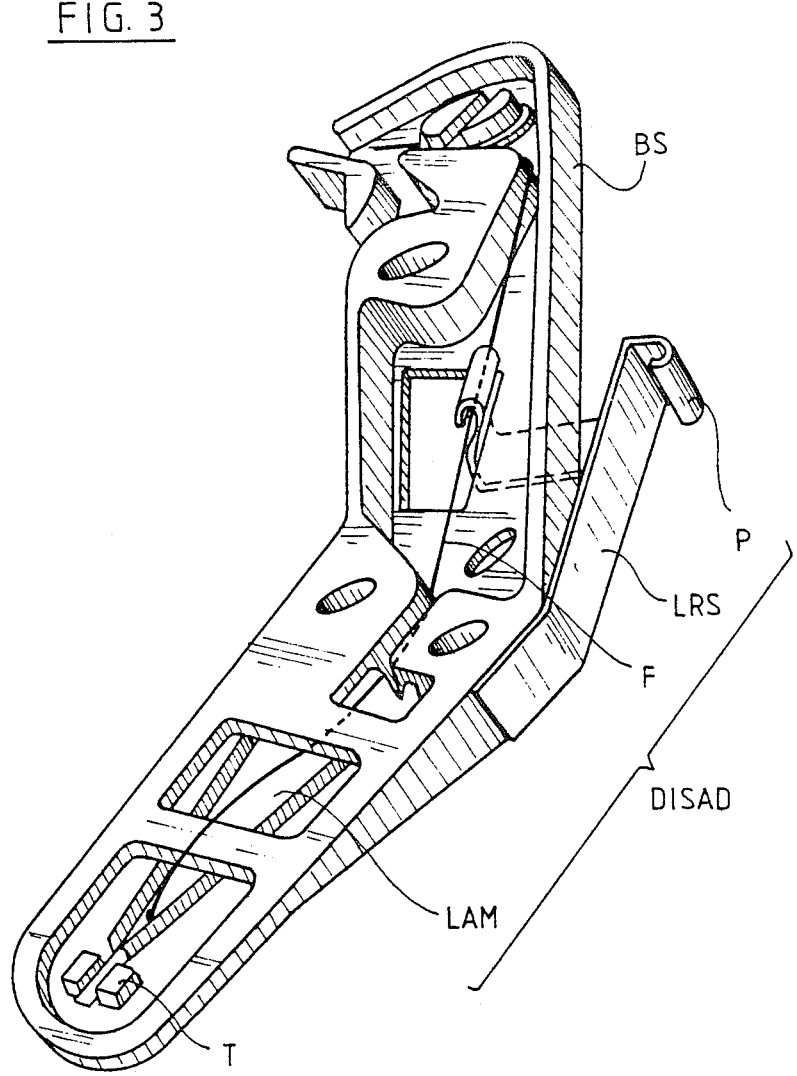

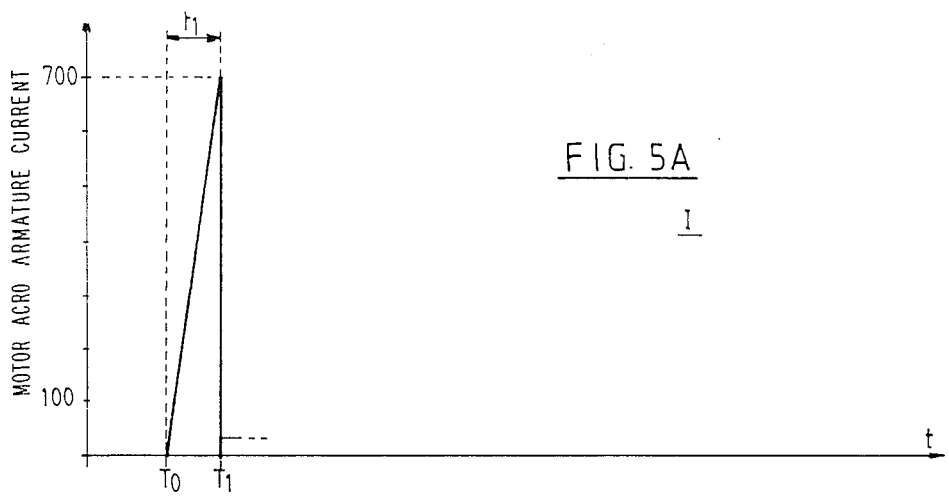
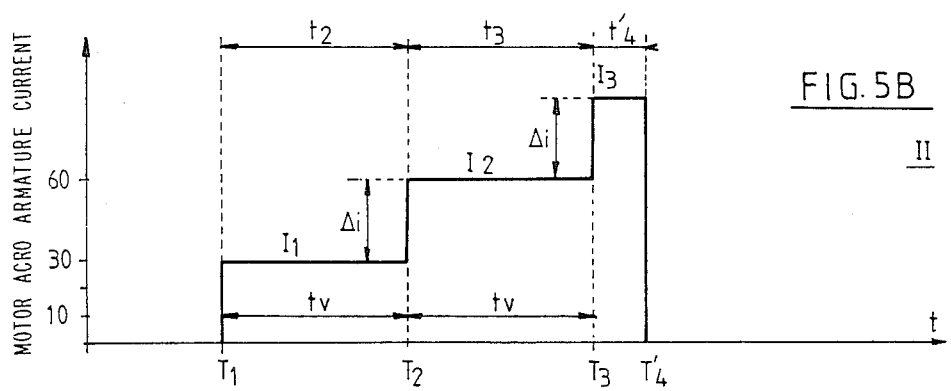
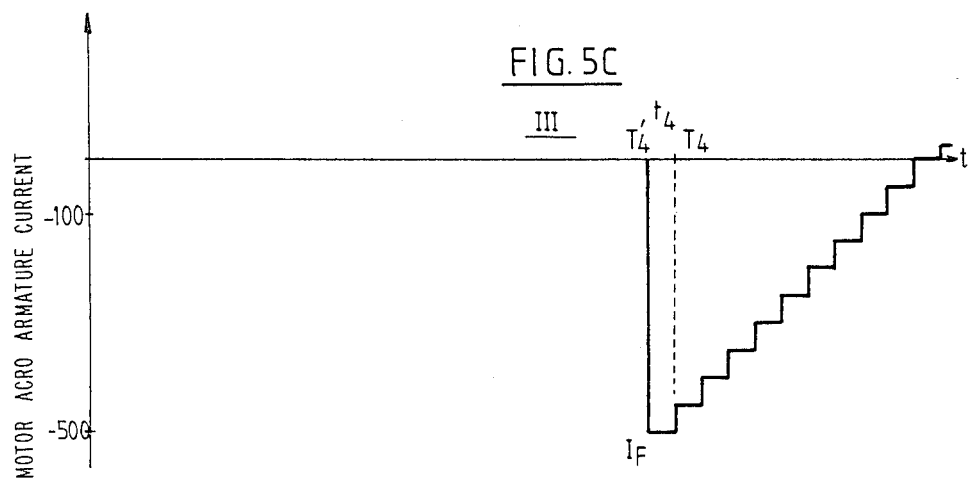

METHOD OF AND APPARATUS FOR DISPLACING A MOVABLE SYSTEM DRIVEN BY AN ELECTRIC MOTOR ALONG A GIVEN TRAJECTORY

FIELD OF THE INVENTION

The present invention relates generally to a motor drive system and apparatus and more particularly to driving a motor with a continuous step excitation waveform such that each of the steps, except the last step, has a constant amplitude that differs from the immediately preceding step by a predetermined incremental value and has the same predetermined time duration, and wherein the last step has an amplitude different from the penultimate step by the predetermined value and a time duration no greater than that of the previous steps and determined by when a mechanism driven by the motor arrives at a predetermined position.

BACKGROUND ART

The present invention is described in connection with the preferred embodiment, as a drive mechanism for a transducer head of a magnetic disk memory. It is to be understood, however, that the invention is, in certain instances, applicable to any motor drive system.

Information is written into and read from circular concentric tracks of magnetic disk memories by read/write transducers, located an extremely small distance above faces of disks of the memory. The transducers are driven radially relative to a turning axis of the disk faces to enable data to be written into or read from all of the concentric tracks on each of the disk faces. During read and write operations, the disks are driven at constant rotational velocity.

A single read/write transducer is associated with each face of a magnetic disk in such a memory. The transducer is mounted on a platform which travels parallel to the disk face and is driven by a linear or rotary electric motor. The platform includes two principal components, namely a head including the transducers and a suspension device. One extremity of the suspension device is an integral part of the head, while the other extremity of the suspension device is an integral part of a rigid arm, in turn an integral part of an output shaft of an electric motor.

Generally, the head including the read/write transducer or transducers associated with one of the disk faces is shaped as a relatively flat rectangular parallelepiped, having an underside facing the disk and containing the transducer. The head includes a large, upper side parallel to the underside, and containing the ends of electric wires connected to the transducer and to electronic read and/or write circuits of the disk memory. A platform of this general type is described in U.S. Pat. No. 4,261,024, commonly assigned with the present invention.

When data are written into and read from the disk, the transducer hovers above the disk face with which it is associated, whereby a layer of compressed air is formed between the underside of the platform head and the disk face. The compressed air layer prevents the head from touching the disk, thereby preventing disk damage. The distance or hovering height between the disk face and the underside of the head is referred to as h. When the platform is at the hovering position, a dynamic balance is provided by opposing the force created by the air cushion on the underside of the platform with a force, referred to as a "load force" directed in the opposite direction from the air cushion force. The load force is applied to the top of the head and has a modulus equal to that of the force established by the air cushion. The load force is relatively light, on the order of 10 to 15 grams, and is supplied by a load plate, an integral part of a fixed, rigid arm for carrying the head. It is difficult to maintain the head at the hovering position. When the disk memory is not operating, the head is parked or located at an "idle position" near the disk periphery off of the disk. In the idle position, the separation height H between the underside of the head and the plane of the disk associated with the head is considerably greater than the hovering height h. In order for the head to begin to hover, the head must be moved from the idle position, at a height H several tenths of a millimeter above the disk face, to a stable hovering position at a height h, several tenths of a micron above the disk surface. Lowering the head from the idle position to the hovering position is difficult, primarily because of air turbulence near the face of the disk.

There is an increasing tendency to employ magnetic disk memory systems having rotary, rather than linear, activated arms for displacing transducer containing heads and for loading the heads into the hovering position. The rotary arm is typically an integral part of a drive mechanism coupled to a rotary electric motor. The drive mechanism typically includes a structure for lifting and lowering the head between the hovering and idle positions. Such a system is described, for example, in copending, commonly assigned U.S. application Ser. No. 467,202, filed Feb. 16, 1983, now U.S. Pat. No. 4,571,648, issued Feb. 18, 1986.

In the system described in the copending U.S. patent application, the positioning mechanism is mounted on a ball bearings. Each head is loaded into the hovering position by a load plate having one extremity connected by an articulated joint to an arm, forming an integral part of a rotary positioning mechanism. A head suspension device is mounted at the other extremity of the load plate. The load plate is mechanically connected to a wire on which rests a follower mounted on a extremity for a spring plate connected by an articulated joint to the arm which is an integral part of the drive mechanism. The follower engages a camming surface or profile of a fixed cam. In one preferred embodiment, the camming surface includes two break points, to divide the camming surface into three distinct sections.

A head is radially displaced and loaded into the hovering position from the idle position in three sequential phases. Each of the three sequential phases corresponds to a position of the cam follower on one of the three sections of cammed surface. The three phases defined by the position of the follower and the three sections of the cam are:

1. The unlocking phase, wherein the rotary drive mechanism is activated between an immobilized or locked condition and a released condition, at an idle height or distance H above the plane of the disk face associated with the head and at a radial position beyond the disk periphery.

2. Driving the head radially, between the position beyond the disk periphery to a position in proximity to the periphery of the disk, while maintaining the head at the idle height H above the plane of the disk.

3. Changing the height of the head between the idle height H and the hovering height h while driving the head radially from in proximity to the disk periphery to a region above the edge of where concentric data tracks are provided on the disk.

In phases 1, 2, and 3, the cam follower is driven across three distinct and different portions of the camming surface. In the first and third phases, the rotary drive mechanism drives the cam follower through less than a complete revolution, while the follower is driven through one complete revolution in phase 2, which defines the center section of the camming surface or profile. In phase 3, a tensile load exerted by the follower on a load plate coupled thereto and carrying the head gradually decreases as the head moves from the idle to the hovering position, to enable the plate and head to be lowered gradually toward the face of the disk. The load plate pulls the head toward the face of the disk in such a way that when the follower reaches the end of its travel, at the end of the third section of the camming surface, the head is in a stable hovering position. When the head reaches the stable hovering position above the face of the disk, the head is said to be loaded. When the head is loaded, the follower no longer engages the camming surface.

When the head is retracted from the loaded or hovering position to the locked position, the cam follower traverses the three sections of the cam surface in the opposite direction, whereby the sequence goes from phase 3 to phase 2, to phase 1. This is referred to as the unloading phase, in contrast to the sequence from phase 1 to phase 2 to phase 3, which is termed the loading phase.

The head displacement and load system may be likened to a movable system which travels along a given trajectory formed by three sections of a cam surface. The movable system including the head displacement and load system is subsequently referred to herein as a mobile component formed of a follower traveling along a cam profile or cam surface and having the same mass and inertia as a head displacement and loading system.

It has been found that as the mobile component completes one cycle over a trajectory of the cam surface and begins another cycle, the resistive, frictional forces opposing the motion of the mobile component along the cam surface are subject to variations up to 50%. Thus, the frictional forces may vary 10 to 15 grams between adjacent cycles of the same machine. Similar observations have been made for different disk memories. The variations are primarily due to changes in environmental factors, such as temperature, humidity, and amount of static electricity in the air.

As the mobile component travels along the cam surface, certain major problems have been found to subsist because of the considerable variation in the frictional forces opposing the motion of the follower along the cam surface. While the mobile component is being unlocked, i.e., while the follower travels along the first section of the cam surface, it has been found desirable to determine when the follower reaches the intersection between the first and second cam sections. Because of the possible variations in frictional forces between adjacent locking and unloading cycles, the cam follower is likely to reach the first break point at different times, even though the same voltage and current are applied to the electric motor driving the mechanism including the follower.

When the follower travels along the second section of the cam surface and reaches the second break point, the velocity of the mobile component should fall within two predetermined values. If the velocity of the mobile component is less than a predetermined value, there is a likelihood that the cam follower will travel backward away from the second break point. If, however, the velocity of the mobile component when the cam follower reaches the second break point is greater than a predetermined value, it is likely that the motor speed is excessive, causing the head to crash onto the disk as it is loaded during the third phase. This obviously has devastating results to both the disk and the head. While the head is being loaded onto the disk, from the idle position, H to the hovering height h during the third phase, the head velocity must fall in a range between a pair of predetermined values (e.g. between 8 and 16 millimeters per second). If the head velocity is excessive during the third phase, there is a risk that the head will crash onto the disk. If the head falls at too slow a rate during the third phase, one head and the mechanism carrying it are likely to oscillate unstably, which may also cause the head to strike the disk.

Thus, it is important for the motor shaft to be displaced at a controlled velocity while the follower is moved on the third section of the cam surface. The motor shaft is likely to be subjected to a sudden drive force as soon as the cam follower has cleared the second break point of the cam surface, as it reaches the third phase. This is because there is a tendency to impart a sudden acceleration to the cam follower when it makes the transition from the second to the third section of the cam surface. It can be shown that the driving power to the motor decreases as a function of the distance of the mobile component relative to the second break point, i.e., the drive power decreases as the distance of the cam follower from the second break point increases as the cam follower moves along the third section of the camming surface.

THE INVENTION

In accordance with a first aspect of the present invention, a member is driven from a first predetermined location to a second predetermined location with a DC motor that drives the member. Means are provided for detecting when the motor has driven the member to the second location. The motor is activated so that the member is driven from the first position to the second position by supplying a continuous step excitation waveform to the motor until the member arrives at the second position. Each of the steps has a constant amplitude that differs from the immediately preceding step by a predetermined incremental value. All of the steps, except the last step, has the same predetermined time duration. The last step has a time duration no greater than that of the previous steps, and determined by when the member arrives at the second position. The incremental amplitude value of each step is determined by the distance the member travels between the first and second points and the maximum velocity that the member can have when it arrives at the second point. The length of each step, except the last step, is determined by the distance the member travels between the first and second points and the minimum velocity that the member can have when it reaches the second point.

In accordance with a further aspect of the invention, a transducer head of a magnetic disk memory is driven between a position proximate the periphery of a disk of the memory and an area on the disk where data are located. An assembly including a radially extending arm carries the head and is driven by a rotary shaft of a DC motor. The motor drives the assembly between a position where the head is beyond the disk periphery and a position proximate the disk periphery while maintaining the head at an idle height above the plane of the disk. The assembly includes mechanical structure synchronized with the turning of the assembly so that as the head is driven further between the position proximate the disk periphery and the edge of the disk area where data are located the head height above the disk force drops from the idle position to a hovering position. A continuous step excitation waveform is supplied to the motor as the head is driven between positions beyond the disk periphery and proximate the disk periphery. The motor is driven by this step waveform until the head arrives at one of the positions. Each of the steps of the excitation waveform has a consistant amplitude that differs from the immediately preceding step by a predetermined incremental value. Each step, except the last step, has the same predetermined time duration. The last step has a time duration no greater than that of the previous steps and determined by when the head arrives at the position. Each incremental step has an amplitude determined by the length of the trajectory for the head between the positions beyond the disk periphery and proximate the disk periphery and the maximum permissible velocity for the head as it arrives at the disk periphery. The equal time durations are determined by the stated trajectory length and the minimum permissible velocity for the head when it arrives at the disk periphery.

In accordance with another aspect of the invention, the motor driving assembly for carrying the head which has been driven to the disk periphery by the step waveform is decelerated by supplying a second excitation waveform having a polarity opposite to the polarity of the step waveform exciting the motor. The second waveform includes an initial constant value having a predetermined duration so the motor has a predetermined angular velocity, preferably zero. The initial constant value having the predetermined duration of the second waveform is followed by a ramp having a linear decreasing variation, which causes the motor angular velocity to remain at a zero value without overshoot and thereafter increases the motor speed to a predetermined constant value. After the second waveform goes through a zero, a constant waveform having a polarity opposite to that of the ramp is applied to the motor.

According to a further aspect of the invention, a method is provided for displacing, translating and loading magnetic disk transducer heads of a movable system having a cam follower moved along a center section of a camming surface between first and second break points thereof, such that the follower clears the second break point at a velocity in a predetermined range, even though the frictional forces applied to the follower and head remain constant for a given cycle, but are subject to substantial variation from one cycle to another, as well as from one disk memory to another.

The method and apparatus for displacing the follower along a third section of the camming surface are such that the velocity of the follower at the time the head stabilizes at the hovering height is within a predetermined range. The method and apparatus for achieving this result are described in the present application, but are claimed in the copending, commonly assigned and simultaneously filed application Ser. No. 803,508 entitled *Method of and Apparatus for Controlling the Displacement of a Movable System Driven by an Electric Motor*.

According to a further aspect of the invention, a succession of current or voltage steps having increasing amplitudes and the same time period, called validation time, is applied to a DC rotary motor. During each step, the position of a mobile component driven by the motor is monitored to determine whether the mobile component has reached the second break point in the camming surface. When the mobile component has reached the second break point, a damping current is applied to the motor to modify the motion of the mobile component.

In the preferred embodiment, arrival of the cam follower at the second break point in the camming surface is detected by measuring velocity changes which the mobile component undergoes at the second break point. The velocity change is measured by differentiating a back emf generated across the armature of the rotary drive motor. By differentiating the back emf, the need to equip the disk memory with an external detecting system for the location of the mobile component is obviated.

In accordance with still another aspect of the invention, an electric motor drives a movable system along a given trajectory, so the movable system arrives with a velocity in a predetermined range at a destination point in the trajectory. The system is subjected to constant resistive, frictional forces for the duration of a given cycle, but these forces are subject to substantial variation from one trajectory cycle to the next. The velocity of the movable system is incremented by incrementing the current or voltage supplied to the motor in successive stages, each having a predetermined validation time. To this end, a series of current or voltage impulses is applied to the motor, while monitoring the mobile component during the validation period of each impulse to determine whether the mobile component has reached the destination point. At the end of each validation time a new current or voltage pulse, having an amplitude higher than that of the preceding pulse, is supplied to the motor if the mobile component has not reached the destination point. When the mobile or movable system has reached the destination point, the current or voltage impulses applied to the motor are terminated. The length of the validation time and the amplitude of the current or voltage increments are respectively a function of the length of the trajectory and of the maximum velocity values and a function of the trajectory length and the minimum velocity.

In accordance with still another aspect of the invention, a read/write transducer for a magnetic disk is carried by a system that displaces and loads it. The system is driven by a rotary DC motor and initially departs from a locked position. Thence, the system is moved so that a follower thereof is driven along a cam between a pair of break points. The system is subjected to resistive forces which remain constant during a given drive cycle, but which may vary substantially from one cycle to the next. To drive the system from the locked position to a destination point where the head is lowered toward a hovering position above the disk, so the head arrives at the destination point at a velocity falling between minimum and maximum values, the following operations are performed in sequence:

1. The system is unlocked by supplying the motor with a current having increasing intensity until the cam follower has reached a first break point along the camming surface at which time the current is suddenly reduced;

2. The system velocity is incremented by increasing the current or voltage supplied to the motor in successive stages (each state has a predetermined validation time) while monitoring the system during the validation time of each impulse to determine whether the follower has reached a second break point on the camming surface. If at the end of a predetermined validation time, the follower has not reached the second break point, a new current impulse having a value greater than that of the preceding current impulse is applied to the motor. The length of the validation time is a function of the length of the trajectory and the minimum velocity value, while the value of the incremental current is a function of the trajectory length and the maximum velocity value.

3. Once it has been determined that the system has driven the head so the follower is at the second break point in the slope, a given reference value for the system velocity (preferably zero) is provided by applying a control current to the motor such that the motor generates a resistive force to counter the driving power applied to the motor when the second break point is reached. The control current supplied to the motor at this time subjects the system to a force having an intensity which decreases as a function of distance of the cam follower from the second break point. The zero velocity is attained without overshoot and subsists for a relatively long interval.

4. The system velocity is then controlled to a predetermined constant value by supplying the motor with a current having a decreasing value such that the system velocity when the head arrives at the destination point falls between another pair of minimum and maximum values.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 3 is a side perspective view in detail of part of the head displacement and loading system;

FIGS. 5A, 5B and 5C, are illustrations of current (I) waveforms in a rotary electric motor during travel of the displacement and loading system along the cam wherein:

FIG. 5A is the motor current waveform to attain unlocking of the displacement and loading system (the mobile component);

FIG. 5B is the motor current waveform when the displacement and loading system travels along the cam between the two break points in the slope, in accordance with the invention;

FIG. 5C is the motor current waveform from the time the displacement and loading system has cleared the second break point in the slope;

DETAILED DESCRIPTION OF THE DRAWINGS

To provide a better understanding of the present invention, the composition and operation of one prior art magnetic head transducer displacement and loading system SCT are now reviewed by referring to FIGS. 1-4. System SCT comprises rotary positioning mechanism POSROT, an integral mechanical part of drive shaft ARBE of rotary DC electric motor ACRO. Head T is moved between a loaded position, where it hovers at height h above disk DISC, and an idle or unloaded position where it is at a greater distance H above the disk by apparatus DISAD that is turned by mechanism POSROT relative to fixed cam CAM. Rotary positioning mechanism POSROT includes a light weight, metallic armature ARMOB that extends radially relative to the axis of rotation of shaft ARBE, and is fixedly mounted on the shaft to turn therewith. At the end of armature ARMOB is fixedly mounted support arm BS, which extends generally tangentially to the radial direction of arm ARMOB and which carries head loading and unloading apparatus DISAD.

Head loading and unloading apparatus DISAD includes load plate LAM for head T, to which a suspension device (not shown) for head T is mechanically connected. Head T is connected to one end of tension wire F, having another end anchored to arm BS in proximity to the intersection of the arm and armature ARMOB. An intermediate portion of wire F contacts spring plate LRS, fitted with cam follower P and fixedly mounted to supporting arm BS.

Figure 1A:
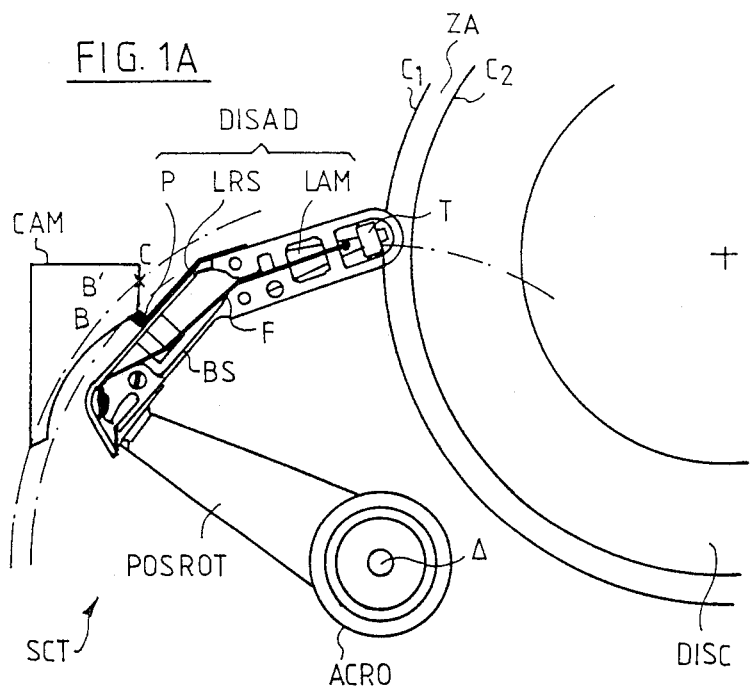
FIGS. 1A and 1B are top views of the relative positions of a rotary electric motor and head displacement and loading system including a cam and cam follower, in combination with a magnetic disk, in the two following situations:
   the head not loaded (not in the hovering position) above the disk (FIG. 1A);
   the head loaded (in the hovering position) over the disk (FIG. 1B)
Figure 1B:
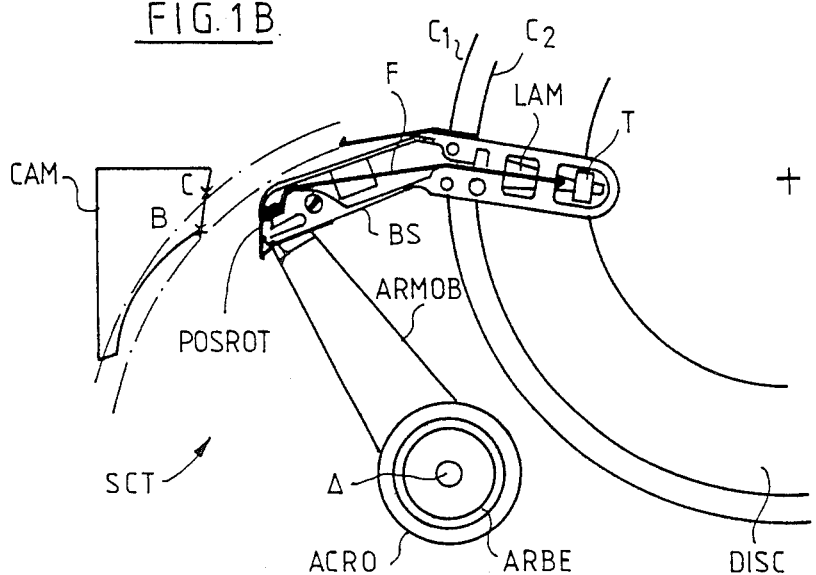

The motion of head loading and unloading apparatus is controlled by cam follower P moving along a cam surface of fixed cam CAM, as head T is moved from a locked position beyond the periphery of disk DISC at idle height H above the disk to a position in proximity to the periphery of disk DISC, at radius $C_1$ at height h, as illustrated in FIG. 1A, to radius $C_2$, the edge of where data are located in the disk at hovering height h, as illustrated in FIG. 1B.

Figure 4:
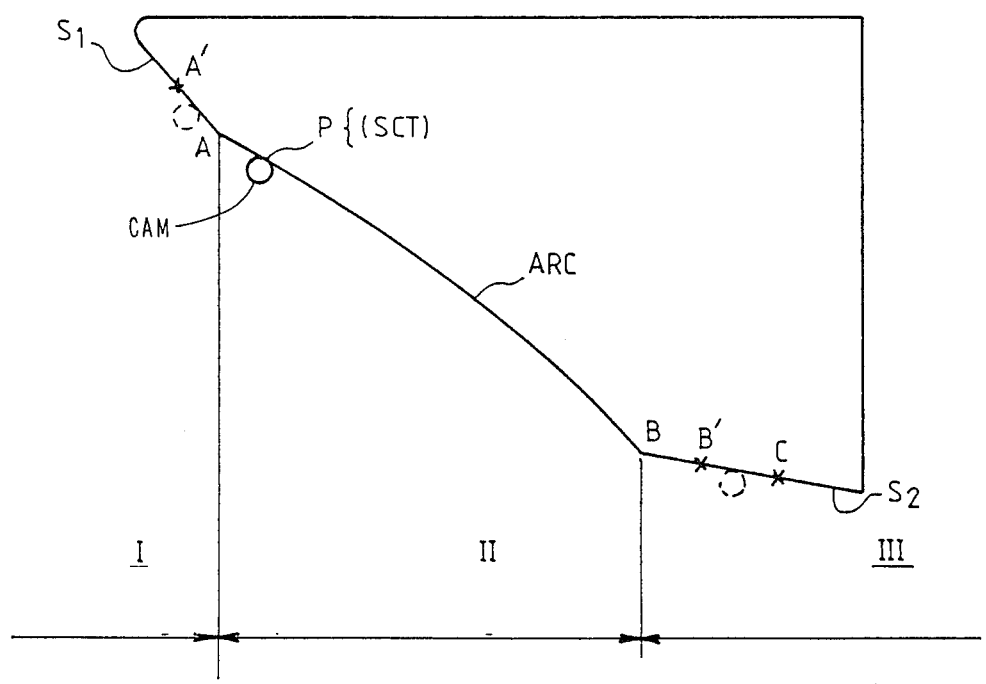
FIG. 4 is a detail drawing of the cam and the cam profile thereof with three sections and two slope break points.

Cam CAM has a profile or camming surface illustrated in FIG. 4 as including two straight line segments $S_1$ and $S_2$ separated by an arcuate surface ARC, which subsists between break points A and B. Arcuate surface ARC defines a sector of a circle displaced by a radius from the axis of rotation Δ of shaft ARBE. Cam follower P travels along a straight line from point A' to break point A, thence along arc ARC to break point B, thence along another straight line to point C. Thus, during a displacement operation by system SCT of head T, follower P sequentially travels along camming surfaces A'A, AB and BC to unlock and load the head. Conversely, when head T is being activated from a loaded to an unloaded and locked condition, follower P sequentially travels along profile sections CB, BA, AA'.

Figure 2A:
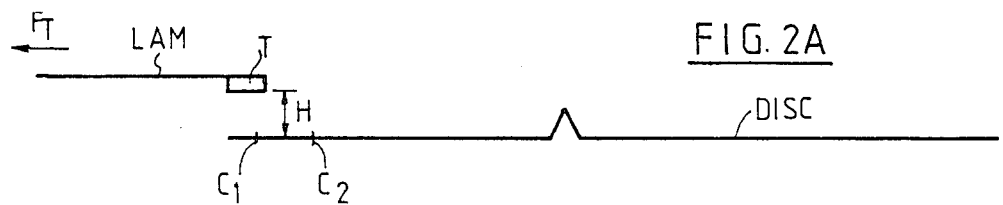
FIGS. 2A and 2B are schematic side views of the relative positions of the head and the disk wherein:
   the head is not loaded (FIG. 2A) and
   the head is loaded (FIG. 2B)
Figure 2B:
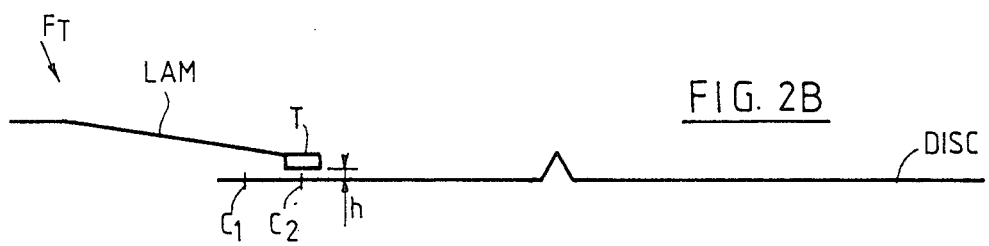

The loading and displacement operations of head T on disk DISC are performed in three sequential phases, as illustrated in FIGS. 1 and 2, as follows:

Phase 1. Unlocking

Initially, follower P is at position A', to the left of break point A, as illustrated in FIG. 4, and system SCT is immobilized or locked. To load head T on disk DISC, system SCT is unlocked by applying a current to rotary electric motor ACRO. Shaft ARBE, armature ARMOB and arm BS rotate in a clockwise direction, as illustrated in FIGS. 1A and 1B, causing cam follower P to move along the camming surface from point A' to break point A. At this time, wire F is maintained in a taut position, whereby head T is outside of the periphery $C_1$ of disk DISC and is at a height H above the plane of the disk. In response to follower P reaching the first break point A of the camming surface of cam CAM, phases two is initiated.

Phase 2. Bringing the heads to the loaded position.

During phase 2, follower P travels along the arcuate portion ARC of the camming surface, between break points A and B in response to motor ACRO driving shaft ARBE and armature ARMOB about shaft rotation axis Δ. During phase 2, head T is brought from its initial position, removed from the periphery of disk DISC while in the locked position, to a position above the disk, facing the disk periphery $C_1$. During phase 2, head T travels in a plane parallel to the plane of disk DISC, whereby the head remains at distance H from the disk planer face. During phases 1 and 2, follower P is positioned such that spring plate LRS exerts a torsional force on wire F, which in turn exerts a tensile load $F_T$ (FIG. 2A) on loading plate LAM. Tensile load $F_T$ maintains head T at height H above the planar face of disk DISC. In response to follower P clearing the second break point B on cam CAM phase 3 is initiated.

Phase 3. Loading

Follower P travels from the second break point B on cam CAM to point C on line segment $S_2$ of the cam surface. In response to such movement of follower P, spring plate LRS is urged away from the edge of supporting arm BS, causing wire F to release the tensile load $F_T$ on load plate LAM, in turn causing the load plate to descend toward the planar face of disk DISC. Thereby head T is loaded over the planar face of disk DISC, so that the distance between the underside of head T and the opposed planar face of disk DISC is h, a hovering height on the order of several tenths of a micron. Further rotation of motor ACRO in the clockwise direction causes follower P to leave the camming surface of cam CAM. At the time follower P engages point C on the camming surface, head T is above circle $C_2$, concentric with circular disk periphery $C_1$, but at a radius less than the disk periphery. Typically, data subsists in the portion of disk DISC having a radius less than circle $C_2$. Motor ACRO is thereafter controlled to position head T at a desired radial track in the data region of disk DISC, in a manner well known to those skilled in the art.

Thus, system SCT includes a movable follower pin P which travels along trajectory A'ABC. While pin P travels trajectory A'ABC, the movable system driving the pin is subjected to resistive frictional forces which remain constant during one cycle of the trajectory, but are likely to vary from one cycle to another. The variations are likely to occur within the same disk memory at different times or in different disk memories because different memories have different characteristics.

Because of the variations in the resistive frictional forces which system SCT encounters, which can vary by as much as 50%, the application of a predetermined current amplitude for a predetermined duration to motor ACRO may not properly displace head T to a hovering position from a locked condition or vice versa. To attain proper conditions for the displacement of head T from the locked position to the hovering position, it is necessary for motor ACRO to displace system SCT in a minimum time period, and to load head T so that the motor shaft angular velocity falls within a predetermined range between predetermined maximum and minimum values at the time pin P engages break point B. For example, if the travel time of system SCT is excessively short, head T is likely to strike the face of disk DISC, or pin P will not clear break point B to prevent head T from being loaded properly above the face of disk DISC.

One object of the invention thus relates to a method of and apparatus for displacing a movable system SCT, which is an integral part of electric motor ACRO, so that a member of the movable system, such as pin P, moves along a given trajectory AB to obviate the disadvantages associated with differing environmental conditions which cause resistive frictional forces to change from trajectory cycle to trajectory cycle, and which further involves displacing a mobile component of the system during phase 2 under optimum conditions of minimum time, to ensure that a destination point is reached at a velocity falling within the predetermined range.

A second object of the invention relates to a method of and apparatus for displacing and loading transducer heads of a disk memory, wherein the heads are displaced and loaded by a rotary electric motor which drives a pin along a trajectory having a pair of break points, by displacing the pin and the heads in accordance with phases 1, 2 and 3, as indicated supra.

The objects of the invention are better understood by referring to the detailed description of the present invention which follows, wherein the operation of the three displacement and loading phases for head T are described in greater detail with reference to FIGS. 5–8.

In accordance with the invention, during phase 1, a ramp current amplitude is applied to the armature of rotary DC motor ACRO; as illustrated in FIG. 5A, the ramp current has an amplitude which increases linearly as a function of time. During phase 1, the position of the drive system responsive to rotation of motor shaft ARBE is monitored to determine when pin P reaches point A on the cam surface of cam CAM. A preferred apparatus for detecting when pin P reaches break point A, as well as break point B, is described infra, in connection with FIG. 7.

The linear positive current ramp illustrated in FIG. 5A begins at time $T_0$ and ends at $T_1$ when it is determined that pin P has reached break point A. The time interval $T_1 - T_0$ is typically on the order of 25 to 30 milliseconds. The initial current ramp supplied to the armature of DC motor ACRO varies typically from 0 to 700 milliamperes between times $T_0$ and $T_1$. When pin P reaches break point A, the drive for motor ACRO is shifted from the waveform illustrated in FIG. 5A to the waveform illustrated in FIG. 5B. The waveform illustrated in FIG. 5B is the current waveform applied to motor ACRO during phase 2, i.e., as pin P is traversing the cam surface between break points A and B.

The waveform of FIG. 5B is a continuous step excitation waveform having a positive polarity. Each of the steps has a constant amplitude that differs from the immediately preceding step by the same predetermined incremental value, $\Delta i$. All of the steps, except the last step, have the same predetermined time duration $t_v$, referred to as a validation time. THe duration of the last step is on longer than the duration of the previous steps, but the last step is terminated when pin P arrives at break point B.

In the specific example of FIG. 5B, at time $T_1$, a current impulse $I_1$, having an amplitude equal to 30 milliamperes, is applied to rotary DC motor ARCO. In the stated example, pin P does not arrive at break point B during the interval $T_1$ to $T_2$ (the validation time $t_v$) typically on the order of 2 seconds. If pin P had arrived at point B prior to time $T_2$ being reached, phase 2 would have been terminated and phase 3 immediately initiated. Because pin P has not reached point B at time $T_2$, a second current impulse $I_2$ is applied to motor ACRO at time $T_2$. Current impulse $I_2$ has an amplitude which is twice the amplitude of impulse $I_1$, whereby there is an incremental current increase $\Delta i$ at time $T_2$. While current impulse $I_2$ is applied to motor ACRO, pin P continues to be moved across the camming surface between break points A and B, without reaching break point B. If, however, pin P had reached break point B, during the interval between times $T_3$ and $T_3$, equal to $t_v$, phase 2 would have been terminated and phase 3 immediately initiated. In the assumed situation, however, at time $T_3$, the current supplied to motor ACRO is again incremented by an amplitude of $\Delta i$, whereby a current impulse $I_3$ having a value equal to $3\Delta i$, i.e., three times the amplitude of impulse $I_1$, is applied to the motor. At time $T'_4$ pin P reaches break point B, signifying that head T is above disk periphery $C_1$, causing phase 2 to be terminated, even though impulse $I_3$ has a duration less than validation time $t_v$.

The duration of validation time $t_v$ is determined by the length L of the curved segment ARC of the camming surface between break points A and B, (in turn determined by the distance head T travels from the unlocked position to periphery $C_1$) and the minimum value $V_1$ for the angular velocity of armature ARMOB at the time pin P reaches point B (in turn determined by the minimum permissible velocity of head T when it arrives at periphery $C_1$), such that $t_v = L/V_1$. The values of the minimum and maximum angular velocities of armature ARMOB at the time pin P reaches break point B are experimentally determined. The incremental value $\Delta i$ in the waveform of FIG. 5B is experimentally determined as a function of the distance between break points A and B along arc ARC and the maximum angular velocity $V_2$ of armature ARMOB at the time pin P reaches break point B (in turn determined by the maximum permissible velocity of head T as it approaches periphery $C_1$). If the incremental value $\Delta i$ is excessive, there is a risk that the angular velocity of system SCT and of armature ARMOB in particular will exceed $V_2$, with adverse effects on head T and disk DISC when the head descends toward the disk during phase 3. Because the current applied to the armature of motor ACRO is incremented by the same value during each validation time, the angular velocity of the output shaft of motor ACRO is incremented by the same amount each time the current applied to the motor is increased during phase 2.

Phase 3 is initiated at time $T'_4$, immediately after pin P reaches break point B. During phase 3, system SCT is subjected to a driving force resulting from a reaction between cam CAM and follower P. The driving force causes movable system SCT to suddenly accelerate when pin P reaches break point B. The driving power decreases as the distance of pin P increases from point B during phase 3. Depending on the environmental conditions encountered by system SCT, this sudden acceleration of system SCT when pin P reaches point B may cause head T to descend with excessive velocity toward the disk during phase 3 which would cause the head to strike the face of disk DISC. To obviate such a possibility, it is necessary to control the motion of movable system SCT during phase 3.

To control the motion of movable system SCT during phase 3, it is initially necessary to activate the movable system so it has an initial predetermined reference velocity, preferably zero, which is attained without overshoot. When pin P reaches point B, at the beginning of phase 3, the velocity of movable system SCT is in a range between the maximum and minimum velocity values of $V_1$ and $V_2$. Immediately after pin P has moved past point B, system SCT is subjected to a sudden acceleration, causing the velocity of arm BS to be unstable and difficult to determine. Hence, control of the motion of system SCT has a tendency at this time to be unstable. It is therefore desired to activate system SCT so it has an initial reference velocity, preferably zero, at the time pin P leaves point B, at the beginning of phase 3.

To reduce the velocity of system SCT to zero when pin P leaves point B at the beginning of phase 3, a current impulse is applied to the armature of motor ACRO at time $T'_4$. The polarity of the current impulse applied to the armature of motor ACRO at time $T'_4$ is opposite to the polarity of the stair wave current levels during phase 2. The intensity and duration of the current impulse beginning at time $T'_4$ are selected in such a way that system SCT has a velocity of zero at time $T_4$, which follows time $T'_4$, such that $T_4 - T'_4 = t_4$. Time interval $t_4$ is typically on the order of several tens of a millisecond. The current pulse which subsists between times $T_4$ and $T'_4$ is referred to as a damping impulse, bearing the designation $I_F$. Impulse $I_F$ has an intensity and duration such that it immobilizes system SCT (the speed of shaft ARBE is zero) after the system has achieved maximum acceleration as pin P leaves point B. The maximum acceleration is experimentally determined.

The duration $t_4$ of impulse $I_F$ is selected such that system SCT has zero velocity without residual oscillation, i.e., no overshot, at time $T_4$, assuming system SCT has maximum acceleration while pin P is at point B. Thus, interval $t_4$ corresponds to the duration of a transitional operation during which the angular velocity $\omega$ of armature ARMOB about axis $\Delta$ decreases from the angular velocity thereof at time $T'_4$ to a value of zero at $T_4$, as illustrated by the waveform in FIG. 6A. When system SCT has zero velocity, i.e., the armature ARMOB is stationary, the system is balanced by the opposing forces due to the action of the driving power due to the reaction of cam CAM on follower or pin P and by the resistive torque exerted by motor ACRO and the frictional forces discussed supra.

Figures 6A, 6B:
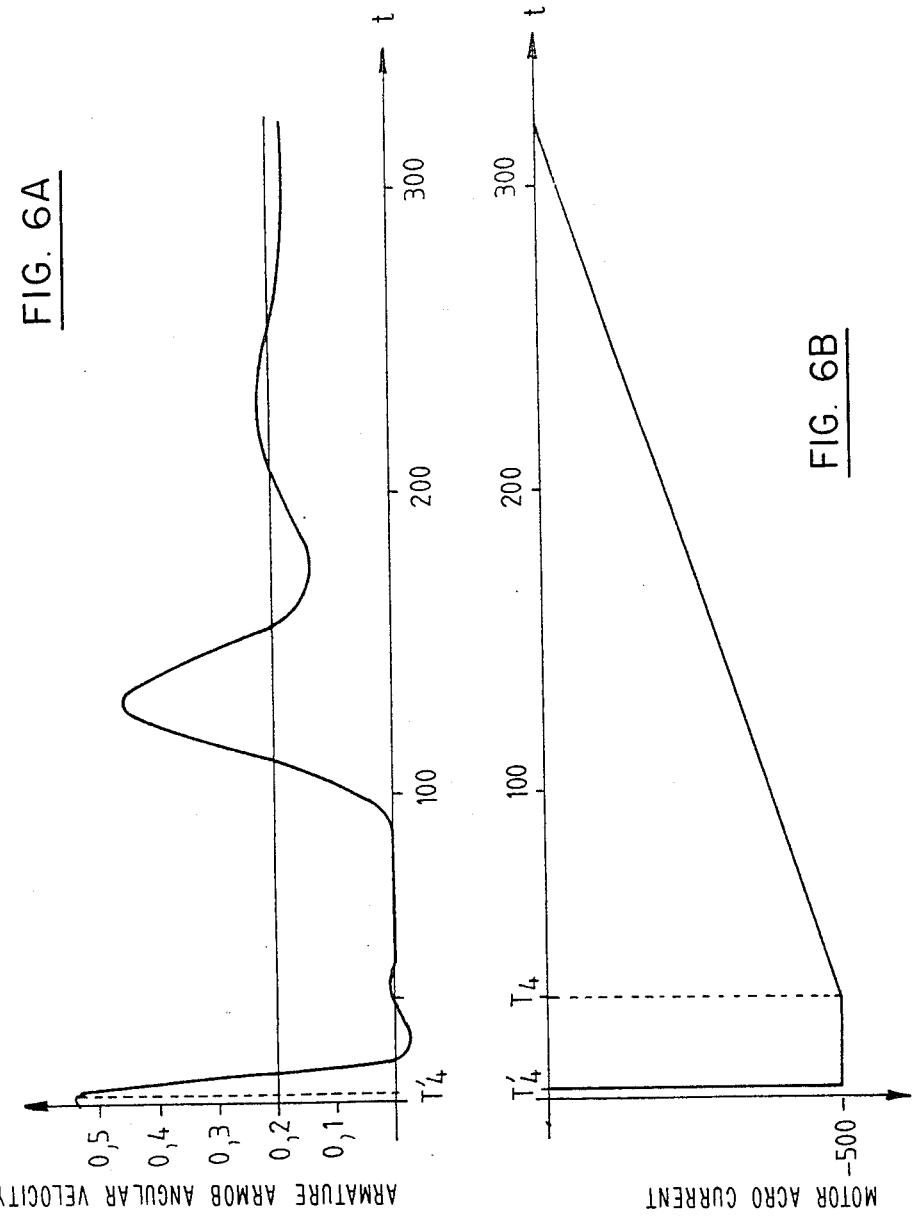
FIGS. 6A and 6B are waveforms for enabling the duration of the damping current in the motor to be experimentally determined, from the time when the displacement and loading system has cleared the second break point in the slope.

At time $T_4$, while system SCT has zero velocity, a current is applied to the armature of motor ACRO. The current applied to motor ACRO at time $T_4$ decreases linearly as a function of time, in the manner indicated in FIGS. 5C and the waveform of FIG. 6B. Typically, the current ramp beginning at time $T_4$ has a duration on the order of 200 to 300 milliseconds and in the preferred embodiment is formed of a stair step wave obtained through a succession of several stages, such as ten stages, each having a duration of about 20 milliseconds. As indicated in FIG. 6A, at the completion of a predetermined interval, the angular velocity of armature ARMOB driving system SCT stabilizes at a non-zero value and remains substantially constant until pin P reaches point C on camming surface CAM. When phase 3 is completed, the current in the armature of motor ACRO is zero. A positive current pulse is then applied for a brief interval to the armature winding of motor ACRO in such a way that the head loading system reaches a predetermined end point position beyond which it cannot travel because of system design.

Consideration is now given to the technique employed for determining whether pin P has been moved to break points A and B on cam CAM. As indicated supra, sudden changes in acceleration of system SCT occur when pin P reaches break points A and B. The sudden change in acceleration of system SCT at these times is detected to determine that pin P is at one of the two break points. The change in acceleration is detected by monitoring and then differentiating the back emf generated across the armature winding of rotary electric motor ACRO.

The back emf of a rotary electric motor can be expressed as $e = -kV$, where V is the angular velocity of shaft ARBE and k is a constant. By differentiating the back emf, one obtains $de/dt = -k(dv/dt) = k\alpha$, where $\alpha$ is the rotary acceleration of shaft ARBE. To determine if points A and B have been reached by pin P, the voltage across the terminals of the armature of motor ACRO is measured, differentiated and the resulting differential is copmared to a given threshold value. The threshold value is experimentally determined so that it is substantially greater than the average acceleration of shaft ARBE as system SCT drives pin P over trajectories A'A and AB. Because the acceleration changes at points A and B differ, the threshold values used to determine whether system SCT has driven pin P to points A and B generally differ. Thus, there are in general two different thresholds, one for trajectory A'A, another for trajectory AB. By measuring the back emf at the terminals of motor ACRO and by differentiating this back emf, a detection system is provided that obviates the need for external sensors, such as optoelectronic sensors responsive to the motion of the system and associated amplifiers.

Figure 7:
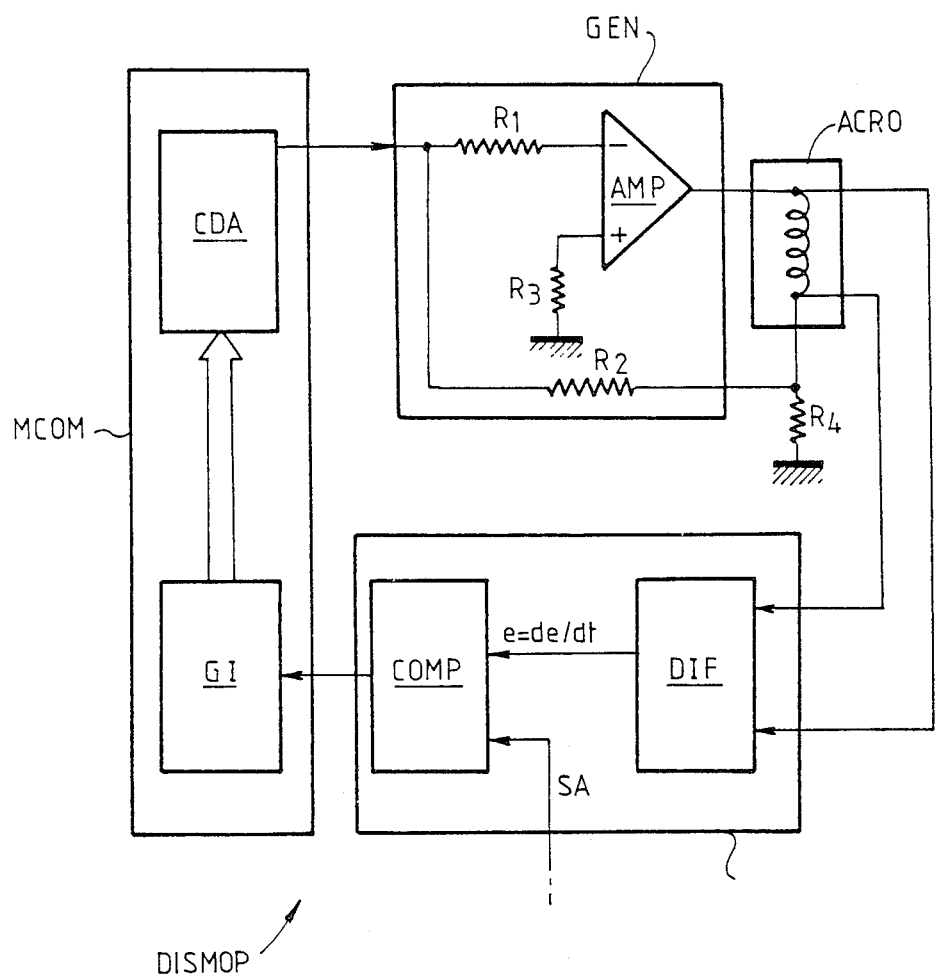
FIG. 7 is a schematic diagram of the apparatus for a head displacement and loading system according to the invention.

Reference is now made to FIG. 7 of the drawing, a partial block diagram and partial circuit diagram of apparatus DISMOP for driving system SCT through phases 1, 2 and 3. Apparatus DISMOP of FIG. 7 includes current generator GEN which responds to an input voltage applied thereto to supply a variable current to the armature of motor ACRO. The control voltage supplied to current generator GEN is derived from controller MCOM, which includes digital instruction generator GI, and digital to analog converter CDA.

Connected across the armature of motor ACRO are input terminals of detector DETECT which responds to the back emf derived across the motor armature and differentiates same to derive a control voltage which is supplied to controller MCOM.

Detector DETECT includes a differentiator DIF having a pair of input terminals connected across the armature terminals of motor ACRO. Differentiator DIF responds to te rate of change of the voltage across the terminals of the armature of motor ACRO to derive an output voltage $e' = de/dt$. The $e'$ output voltage of differentiator DIF is applied to one input of comparator COMP, having a second input responsive to analog voltage SA, indicative of set point values for $e'$ at the times pin P intersects points A and B. While system SCT is in phase 1, the value of SA is commensurate with the acceleration of system SCT while the system is loading head TEL and when pin P engages break point A. When the system SCT is in phase 2 and is moving toward phase 3, the value of signal SA is commensurate with the acceleration of system SCT when pin P reaches break point B. The value of signal SA also is subject to different values when the system is going from a loaded to a locked position, whereby when system SCT is in phase 3 and pin P is moving toward break point B, the value of signal SA is associated with the acceleration of the system when point B is traversed by pin P. The value of signal SA is commensurate with the acceleration of system SCT when pin P moves from the arcuate region of cam CAM to break point A, on its way toward point A'.

In response to the value of $e'$ being less than the value of signal SA, as occurs at all times except when break points A and B are encountered, comparator COMP derives a binary zero output that has no effect on digital instruction generator GI. However, in response to system SCT having an acceleration associated with break point A or B being encountered, the value of $e'$ exceeds the value of signal SA, causing comparator COMP to derive a binary 1 output level. The binary 1 output level of comparator COMP is coupled to digital instruction generator GI to increment the algorithm or program stored by the instruction generator.

Voltage to current converter or generator GEN includes differential amplifier AMP having a positive input terminal connected to ground through resistor $R_3$ and a negative input terminal connected to resistor $R_1$ responsive to the output voltage of controller MCOM and to a voltage indicative of the back emf across the terminals of the armature of motor ACRO. The voltage indicative of the back emf of the armature of motor ACRO is derived by connecting one terminal of the armature to a terminal of resistor $R_4$, having a second terminal which is grounded. The common terminal of the armature of motor ACRO and resistor $R_4$ is connected via resistor $R_2$ to resistor $R_1$. Generator GEN converts the voltages supplied to it by controller MCOM and the back emf of motor ACRO into current pulses that are supplied back to the motor armature. Hence, controller MCOM derives voltages which are replicas of the current waveforms illustrated in FIG. 5A, and generator GEN converts these voltage waveforms into current waveforms which drive the armature of motor ACRO.

Controller MCOM includes digital instruction generator GI which derives multibit binary signals that are coupled to digital-to-analog converter CDA. In a preferred embodiment, instruction generator GI is a microprocessor containing a microprogram for supplying a sequence of binary instruction signals to converter CDA in accordance with an algorithm represented by the flow diagram of FIG. 8. For each binary bit sequence supplied by generator GI to converter CDA the converter derives a corresponding voltage output which is transformed into a current impulse by generator GEN.

Figure 8:
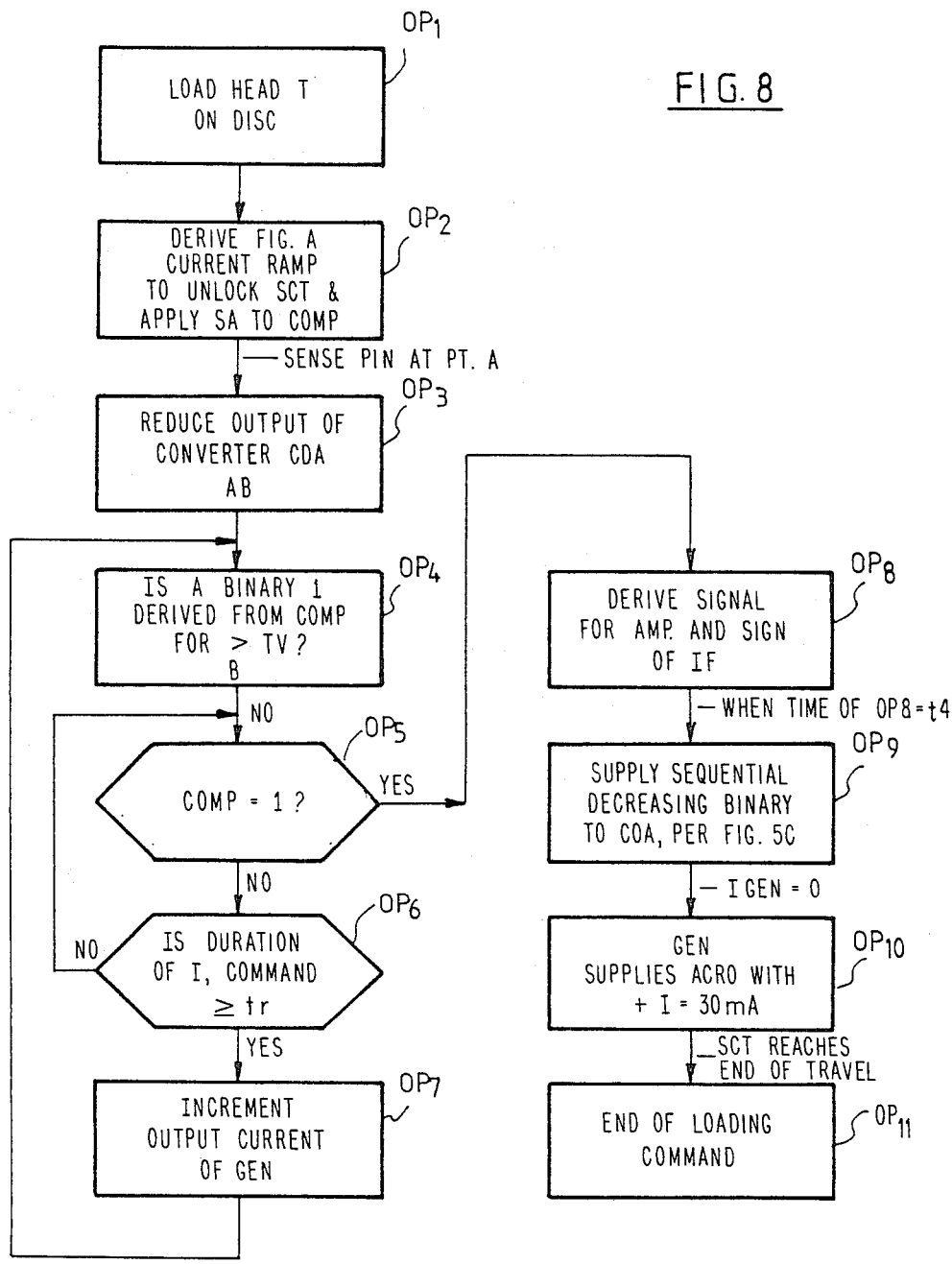
FIG. 8 is a flow diagram of an operating algorithm of the apparatus shown in FIG. 7.

The operations performed by instruction generator GI are listed in the flow of diagram of FIG. 8. The flow diagram of FIG. 8 includes operations $OP_1$–$OP_{11}$. During operation $OP_1$, a command to load head T on the planar face of disk DISC is derived. Then operation $OP_2$ is executed, during which the current ramp of FIG. 5A is derived to unlock system SCT and to apply a signal SA to comparator COMP of detector DETECT commensurate with the derivative of the back emf derived by motor ACRO when pin P reaches break point A during the loading operation.

Instruction generator GI remains at operation $OP_2$ until system SCT drives pin P to point A, as indicated by a binary 1 output of comparator COMP. In response to the binary 1 output of comparator COMP, digital instruction generator GI is incremented to operation $OP_3$. During operation $OP_3$, instruction generator GI derives a binary signal that reduces the output voltage of converter CDA from the value associated with the waveform of FIG. 5A at time $T_1$ to the value associated with the waveform of FIG. 5B at time $T_1$. Digital instruction generator GI now causes system SCT to enter phase 2, causing the amplitude of signal SA to change to a value associated with the derivative of the back emf, $e'$, derived by differentiator DIF when pin P reaches break point B during the loading operation.

Instruction generator GI is incremented to operation $OP_4$ immediately after the value of signal SA has been changed and the instruction generator has derived a binary word commensurate with the amplitude of the current impulse $I_1$ at time $T_1$. During operation $OP_4$, instruction generator GI monitors the output of comparator COMP to determine if a binary 1 level is derived by the comparator. If a binary 1 signal is not derived by comparator COMP for a period equal to the length of validation time $t_v$, instruction generator GI is advanced to operation $OP_5$. During operation $OP_5$ the output of comparator COMP is monitored. In response to a binary 1 being derived by comparator COMP, instruction generator GI is advanced to operation $OP_8$, to indicate that pin P has moved across the arcuate portion of the camming surface of cam CAM to break point B. If a binary zero output is derived by comparator COMP instruction generator GI is advanced to operation $OP_6$. During operation $OP_6$ the time that instruction generator GI has been commanding derivation of impulse of $I_1$ is checked to determine whether the duration of the impulse is equal to validation time $t_v$. If instruction generator GI has been instructing derivation of impulse $I_1$ for a time less than validation time $t_v$, operation $OP_6$ is repeated. If instruction generator GI has been instructing derivation of impulse of $I_1$ for a time equal to validation time $t_v$, instruction generator GI is stepped to operation $OP_7$. During operation $OP_7$, instruction generator GI derives a new binary signal value, commensurate with the amplitude of current impulse $I_2$.

If as a result of operation $OP_5$, instruction generator GI is stepped to operation $OP_8$, the instruction generator derives a binary signal value commensurate with the amplitude and polarity of current impulse $I_F$, as subsists at the beginning of phase 3, during time interval $t_4$, between times $T'_4$ and $T_4$, as indicated in FIG. 5C. When instruction generator GI remains in operation $OP_8$ for an interval equal to $t_4$, the instruction generator is stepped to operation $OP_9$. During operation $OP_9$, instruction generator GI supplies sequential, decreasing binary signal values to converter CDA to derive the stair step waveform of FIG. 5C starting at time $T_4$, and ending when instruction generator GI derives a binary signal commensurate with a zero value for the output current of generator GEN. When instruction generator GI derives a binary value associated with a zero current output of generator GEN, the instruction generator is advanced to operation $OP_{10}$. Typically, instruction generator GI stays in operation $OP_9$ for an interval ranging from 200 to 300 milliseconds.

In operation $OP_{10}$, instruction generator GI supplies a binary signal to converter CDA to drive motor ACRO with a current having a positive value, typically equal to 30 milliamperes. The positive current impulse I derived by generator GEN during operation $OP_{10}$ is applied to motor ACRO until system SCT reaches the end of its travel, frequently referred to as the forward stop. When the forward stop is reached, instruction generator GI is advanced to operation $OP_{11}$, during which the end-of-loading command is derived by the instruction generator. Thereafter, motor ACRO is controlled by signals from a computer with which the magnetic disk memory is associated, to retrieve data from designated annular data tracks of disk DISC.

While there has been described and illustrated one embodiment of the invention, it will be clear that variations in the details of the embodiment specifically illustrated and described may be made without departing from the true spirit and scope of the invention as defined in the appended claims.

What is claimed is:

1. A method for displacing a mobile component driven by a DC electric motor along a given trajectory toward a given destination point thereof, wherein the mobile component is subjected to constant resistive forces for the duration of a particular trajectory cycle, the resistive forces being subject to substantial variation from one trajectory cycle to another trajectory cycle, the mobile component when driven to the destination point having a permissible velocity in a range between predetermined maximum and minimum values, comprising the steps of supplying incrementing, excitation pulses to the motor to increment the motor speed and the velocity of the mobile component, the excitation pulses including successive intervals each having a predetermined time duration, monitoring the mobile component during the time duration of each pulse to determine whether the mobile component has reached the destination point, supplying the motor with a new excitation pulse at the end of each of said time durations if the mobile component has not reached the destination point by the end of the particular time duration, the new excitation pulse having an amplitude exceeding the amplitude of the immediately proceding pulse, terminating the application of the excitation pulses to the motor when the mobile component has reached the destination, selecting the pulse time duration as a function of the length of the trajectory and of the minimum velocity value, and selecting each incremental change in the amplitude of adjacent pulses as a function of the length of the trajectory and of the maximum velocity value.

2. The method of claim 1, wherein the presence of the mobile component at the destination point is detected by effectively measuring the acceleration of the mobile component and by comparing the measured acceleration of the mobile component with a predetermined acceleration value.

3. A method of displacing and loading a transducer head of a magnetic disk, said head being mechanically driven by a DC motor having an output shaft coupled to the head via a mechanism including a cam follower driven by the shaft along a cam surface having first, second and third segments, the first and second segments being separated by a first break point, the second and third segments being separated by a second break point, a pin driven by the mechanism being initially located at point A' on the first segment while the mechanism is in a locked state, the mechanism being subjected to constant resistive forces for the duration of each particular cycle, the resistive forces having a tendency to vary substantially from one cycle to another cycle, the mechanism including structure synchronized with turning of the shaft to cause the head to be moved from an idle position when the cam follower is at the second break point to a hovering position when the cam follower is driven to a destination point on the third segment, the mechanism driving the head from an initial position outside of the disk periphery to a position adjacent the disk periphery in response to the shaft driving the mechanism so the pin moves from point A' along the first segment to the first break point, the head moving from the disk periphery to a position at an edge of data tracks on the disk in response to the shaft driving the mechanism so that the pin moves from the first break point to the second break point, the method comprising the steps of:
unlocking the mechanism while the cam follower is at position A' by applying a current having an increasing intensity to the motor until the motor drives the mechanism so that the cam follower is at the first break point;
incrementing the velocity of the mechanism by incrementing an excitation waveform for the motor in successive stages, each of said stages having a predetermined time duration, the waveform including a series of pulses having the same direction, adjacent pulses having amplitudes that differ from each other by the same predetermined amplitude, the incrementing waveform being applied to the motor when the cam follower reaches the first break point and being terminated when the cam follower reaches the second break point, the time duration of each pulse being the same, except the time duration of the last pulse which is terminated when the cam follower reaches the second break point, the shaft velocity being between predetermined maximum and minimum values at the time the cam follower reaches the second break point from the second segment, the value of said time durations being a function of the length of the trajectory and of said minimum velocity, the value of each current increment being a function of the length of the trajectory and the maximum velocity.

4. The method of claim 3 further comprising the step of applying a control excitation pulse to the motor when the cam follower reaches the second break point from the second segment, the control excitation pulse having a predetermined value and duration to cause the shaft to have a predetermined reference angular velocity at the completion of the duration of the control excitation pulse so that the mechanism has a predetermined velocity to overcome the inertia of the mechanism when it reaches the second break point from the second segment.

5. The method of claim 4 further comprising the step of supplying the motor with an excitation waveshape which decreases in amplitude immediately after the control excitation pulse has been applied to the motor, the control excitation pulse exciting the motor so that the mechanism has a velocity between the maximum and minimum values at the time the cam follower reaches the destination point on the third segment.

6. The method of claim 5 wherein the control excitation pulse is a damping pulse for causing the mechanism to have zero velocity at the completion of the control excitation pulse duration.

7. The method of claim 6 wherein the excitation waveshape applied to the motor immediately after the damping impulse has terminated ramps toward a zero value with a slope such that the motor velocity remains substantially at zero without overshoot for an appreciable time interval and the motor velocity then is driven by the ramping waveshape to a predetermined constant value as the ramping waveshape approaches a zero value and at the time the ramping waveshape has a zero value.

8. The method of claim 7 further comprising the step of applying a brief pulse having a polarity opposite to that of the ramping waveshape to the motor immediately after the ramping waveshape goes through a zero value.

9. The method of claim 3 further comprising the step of monitoring the system acceleration and comparing the system acceleration with predetermined values therefore to determine when the head is at the two break points.

10. The method of claim 9 wherein the system acceleration is determined by monitoring back emf generated by the motor, differentiating an indication of the generated back emf to derive an indication of the derivative of the back emf with respect to time, and comparing the indication of the derivative of the back emf with respect to time with a predetermined value.

11. The method of claim 10 wherein the predetermined value used for comparison to the derivative of the back emf with respect to time differs for the two break points.

12. Apparatus for driving a transducer head of a magnetic disk memory between a position beyond the periphery of a disk of the memory to a position proximate the periphery of the disk while maintaining the head in an idle position above a plane defined by a face of the disk comprising an assembly for carrying the head, the assembly including a radially extending arm, a rotary DC motor for turning the arm, means for detecting when the head arrives at the position beyond the disk periphery and when the head arrives at the position proximate the disk periphery, and means responsive to said detecting means for driving the motor so the head is moved between the position beyond the disk periphery and the position proximate the disk periphery, said driving means supplying a continuous step excitation waveform to said motor as the head is driven between the position beyond the disk periphery and the position proximate the disk periphery until the head arrives at one of the positions, each step of said step excitation waveform having a constant amplitude differing from the amplitude of the immediately preceding step by a predetermined incremental value, each of said steps, except the last step, having the same predetermined time duration, the last step having a time duration no greater than that of the previous steps and determined by the interval when the penultimate step is terminated and the head arrives at said one position.

13. The apparatus of claim 12 wherein the detecting means includes acceleration monitoring and comparing means effectively responsive to the acceleration of the head carrying assembly and for comparing the acceleration of the assembly with a predetermined value therefor.

14. The apparatus of claim 13 wherein the acceleration monitoring and comparing means includes means for monitoring back emf across an armature of the motor, means for deriving a time derivative of the monitored back emf, and means for comparing the derivative of the monitored back emf with a reference value.

15. Apparatus for driving a transducer head of a magnetic disk memory between a first position beyond the periphery of a disk of the memory to a second position proximate the periphery of the disk and between the second position and a third position inside of the periphery of the disk at the edge of data tracks on the disk, the apparatus comprising an assembly for carrying the head, the assembly including a radially extending arm, a rotary DC motor for turning the arm, the assembly including mechanical structure synchronized with turning of the arm so that as the head is driven between the first and second positions the head is maintained at an idle position in a plane above a face of the disk and so that as the head is moved between the second and third positions the head moves between the idle position and a hovering position where the head is located to operatively transduce magnetic data on the disk, means for detecting when the head arrives at the first and second positions, and means responsive to said detecting means for driving the motor so the head is moved between said first and second positions and between said second and third positions, said driving means: supplying a continuous step excitation waveform having a first polarity to said motor as the head is driven between said first and second positions until said head arrives at one of said positions, each step of said step excitation waveform having a constant amplitude differing from the amplitude of the immediately preceding step by a predetermined incremental value, each of said steps, except the last step, having a duration no greater than that of the previous steps and determined by the termination of the penultimate step and when the head arrives at said one position, supplying a second excitation waveform having a second polarity, opposite to the first polarity, to the motor while the head is at the second position and is being driven toward the third position, the second waveform including an initial constant value having a predetermined interval causing the motor to have a predetermined angular velocity at the completion of the interval, the second waveform including a ramp following the initial constant value thereof, the ramp causing the motor angular velocity to remain at the predetermined angular velocity it had at the completion of the predetermined interval for a substantial time period so that the motor shaft and head do not overshoot and oscillate, the ramp decreasing toward zero from the initial constant value of the second waveform to cause the motor shaft angular velocity to have a constant predetermined value at the time the head approaches and arrives at the third position.

16. The apparatus of claim 15 wherein the assembly includes a cam follower for engaging a stationary cam surface, the cam surface having first, second and third segments, the first and second segments being separated by a first break point, the second and third segments being separated by a second break point, the mechanism driving the cam follower so that as the head moves between the first and second positions, and between the second and third positions, the cam follower moves along the second and third segments of the cam, respectively.

17. The apparatus of claim 16 wherein said motor driving means includes means for applying a ramping excitation waveform having the first polarity to the motor during the interval while the cam follower is driven along the first segment.

18. The apparatus of claim 17 wherein the motor driving means includes mean for supplying a linear ramp excitation waveform to the motor while the head is at the first position to energize the head between a locked and unlocked position.

19. Apparatus for driving a member from a first predetermined position to a second predetermined position comprising a DC rotary motor for driving the member, means for detecting when the motor has driven the member to the second position, means for activating the motor so the member is driven from the first position to the second position, said driving means supplying a continuous step excitation waveform to said motor as the member is driven between said first and second positions until said member arrives at the second position, each step of said step excitation waveform having a constant amplitude that differs from that of the immediately preceding step by a predetermined incremental value, each of said steps, except the last step, having the same duration, the last step having a duration no greater than that of the previous steps and determined by the occurrence time of the termination of the penultimate step and when said head arrives at said second position.

20. The apparatus of claim 19 wherein said means for detecting includes means for effectively detecting the acceleration of the member and for comparing the determined acceleration with a constant value therefor associated with the acceleration of the member at the second position.

21. The apparatus of claim 20 wherein the means for effectively determining acceleration includes means for monitoring back emf across an armature of the DC motor, and means for differentiating the monitored back emf.

* * * * *